Feb. 13, 1934.  G. T. HORTON  1,946,494
TANK CONSTRUCTION
Filed June 13, 1932
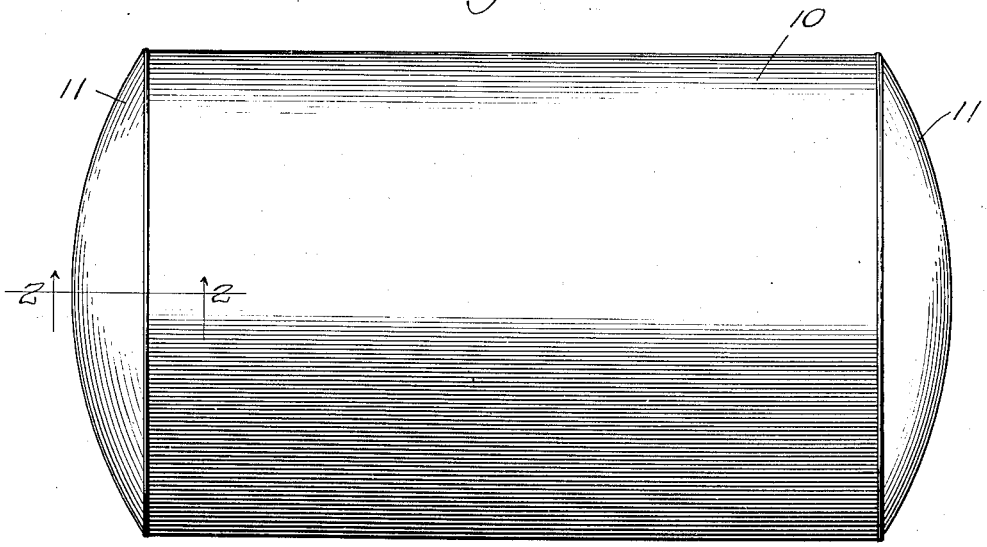
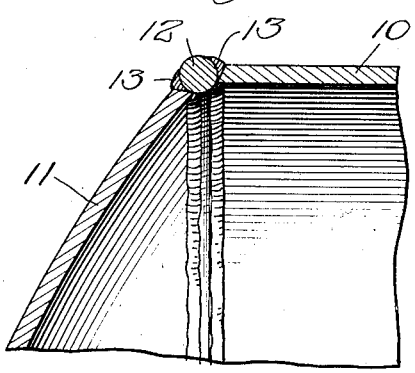
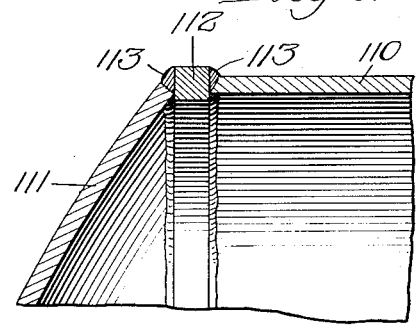
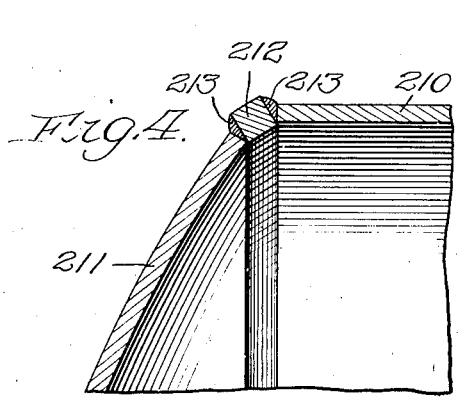
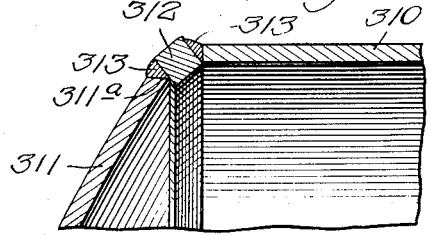
Inventor:
George T. Horton.
By Dynrenforth, Lee, Chritton & Wiles,
Attys.

Patented Feb. 13, 1934

1,946,494

UNITED STATES PATENT OFFICE 1,946,494

TANK CONSTRUCTION

George T. Horton, Chicago, Ill., assignor to Chicago Bridge & Iron Company, Chicago, Ill., a corporation of Illinois Application June 13, 1932. Serial No. 617,004

5 Claims. (Cl. 29—148.2)

This invention relates to improvements in pressure tanks and method of making the same and, more especially, welded pressure tanks.

The principal feature of my invention is the use of a circumferential bar at the junction of a dished head and the cylindrical shell of a pressure tank. The head may be formed by pressing or dishing to a uniform curvature, for example, a segment of a sphere. The invention applies to an outwardly curved head which is substantially less than a hemisphere. When such a head is employed, internal pressure tends to bulge the center of the head outwardly and draw in the rim. This imposes compression stresses at the periphery of the head. The bar may be of any desired shape, in cross-section, for example, round or square.

The bar is made sufficiently large to withstand the ring compression stresses induced by the inward pull of the head when the internal pressure is applied. This feature saves the expense of forming an ellipsoidal or quasi-ellipsoidal head with a short radius of curvature at the junction with the shell, as has frequently been employed in the past. The use of a bar, as indicated, is particularly adapted to weld construction, as slight variations in diameter of the head and shell do not interfere with the assembly and welding.

The use of a bar, as indicated, also eliminates the necessity of an outer or inner compression member where a head of uniform curvature is employed. Besides serving as a compression member, the bar contributes the other advantages above referred to.

Other features and advantages of my invention will appear more fully as I proceed with my specification.

In those forms of device embodying the features of my invention shown in the accompanying drawing—

Figure 1 is a view in side elevation; Fig. 2 is a view taken as indicated by the line 2 of Fig. 1; and Figs. 3, 4 and 5 are views similar to Fig. 2 showing modifications.

As shown in the drawing, the pressure tank includes the cylindrical shell 10 with the two heads 11, 11.

The head 11 is made by pressing or dishing a sheet of metal to a uniform curvature. That is, the periphery does not need to be curved with a shorter radius where it joins the shell. As here shown, the curvature is substantially spherical. With a head of this kind, pressure against the head will cause the periphery thereof to pull inwardly. In the construction here shown, this pull is taken up by the ring compression member 12, shown in Figs. 1 and 2 as a bar with a circular cross-section. The edges of the shell 10 and the head 11 are attached to the bar 12 by suitable welding 13, for example, electric arc weldng. The edges of the shell and head may be beveled as necessary or desirable, in order to form a space to receive the welding metal, as is usual in common welding practice. The cross-section of the ring member 12 is sufficiently large to withstand the ring compression stresses induced by the inward pull of the head 11 when the gas or liquid pressure is applied inside of the tank.

In the construction shown in Fig. 3, the shell and head are indicated by 110 and 111, respectively. In this case, the ring compression member is a bar 112 which is square in cross-section. The welding is indicated by 113.

In the form shown in Fig. 4, the shell and head are indicated by 210 and 211, respectively. In this case, the ring compression member is also a square bar 212 but turned somewhat so that the edges of the shell and head need not be beveled to form grooves or spaces for the reception of the welding metal 213. By using a square bar and turning the same so that it lies diagonally, there will be grooves formed between the bar and the edges of the shell and the head, even though said edges are not beveled but are left square cut as the plates come from the mill.

In Fig. 5, the shell and head are indicated by 310 and 311, respectively, and a square bar 312 is used. As here shown, the bar is turned somewhat more than in the construction of Fig. 4 to provide a wider groove for the welding metal 313 between the bar and the shell. When the bar is thus turned at a greater angle, it is advisable to bevel the edge 311ª of the head, as shown.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. The method of attaching an outwardly curved head, substantially less than a hemisphere to a cylindrical pressure tank, comprising, placing a ring compression member between the adjacent edges of the shell and head, and welding the edges of the shell and head to said ring compression member.

2. A cylindrical pressure tank, including; a cylindrical shell; an outwardly curved head substantially less than a hemisphere; and a ring compression member between the adjacent edges of the shell and head, the edges of the shell and head being welded to said ring compression member.

3. A pressure tank, including; a cylindrical shell with a square edge; an outwardly curved head, substantially less than a hemisphere with a square edge; and a ring compression member substantially square in cross-section between the adjacent square edges of the shell and head, said member being turned to provide welding grooves between its opposite faces and the adjacent square edges of the shell and head, the head and shell being welded to such ring compression member.

4. The method of attaching an outwardly spherically curved head, substantially less than a hemisphere, to the shell of a cylindrical pressure tank, comprising placing a ring compression member between the adjacent edges of the shell and head, and welding the edges of the shell and head to said ring compression member.

5. A pressure tank including; a cylindrical shell; an outwardly spherically curved head, substantially less than a hemisphere; and a ring compression member between the adjacent edges of the shell and head, the edges of the shell and head being welded to said ring compression member.

GEORGE T. HORTON.